June 23, 1964    W. E. TRAGERT    3,138,487
FUEL CELL

Filed Feb. 28, 1961      3 Sheets-Sheet 1

Inventor:
William E. Tragert,
by Paul R. Webb, II
His Attorney.

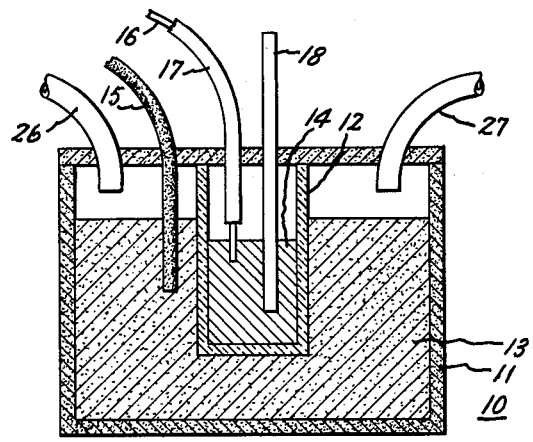
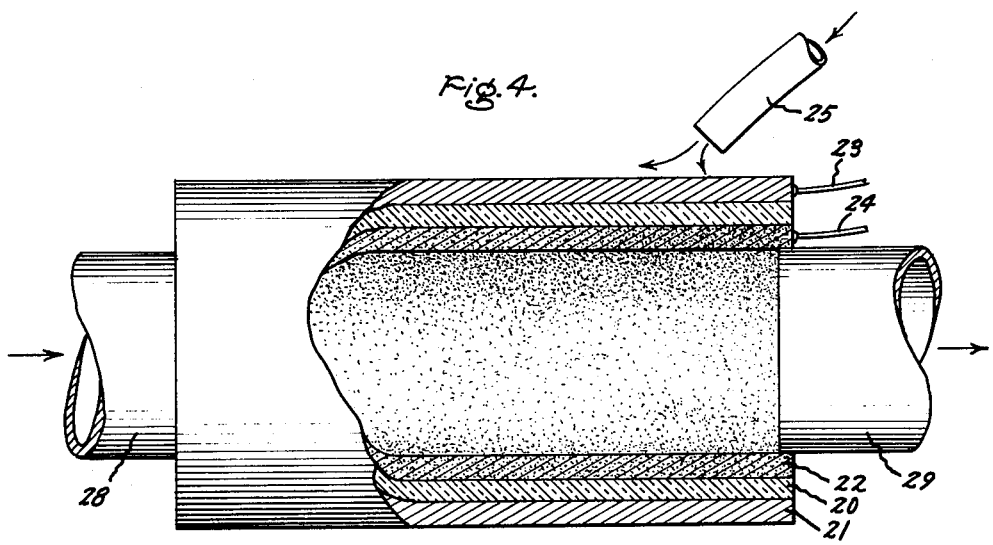

June 23, 1964 W. E. TRAGERT 3,138,487
FUEL CELL
Filed Feb. 28, 1961 3 Sheets-Sheet 3
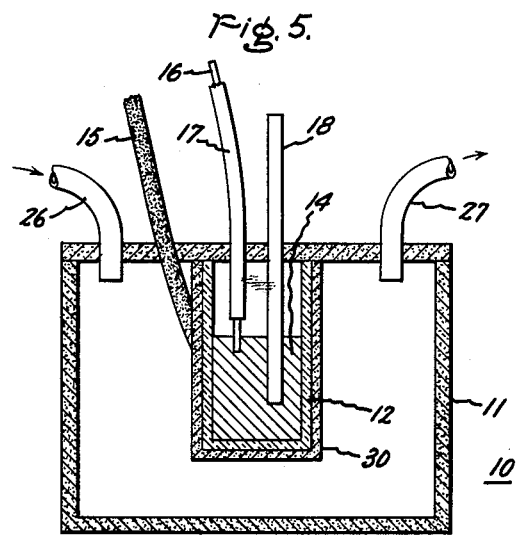
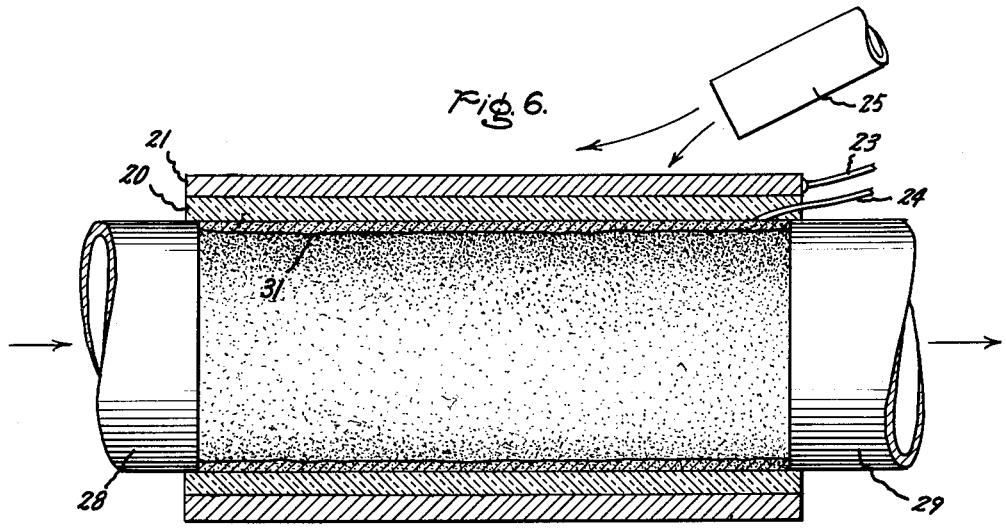
Inventor:
William E. Tragert,
by Paul R. Webb, II
His Attorney.

United States Patent Office 3,138,487
Patented June 23, 1964

3,138,487
FUEL CELL
William E. Tragert, Scotia, N.Y., assignor to General
Electric Company, a corporation of New York
Filed Feb. 28, 1961, Ser. No. 92,354
20 Claims. (Cl. 136—84)

This invention relates to fuel cells and more particularly to high temperature fuel cells in which the cathode is in liquid state and the electrolyte and anode are in solid state during cell operation.

Where electrical energy is generated from the heat of chemical reactions, a fuel is generally oxidized by air and the chemical energy of the fuel is converted into heat and mechanical energy. This heat and mechanical energy is then used in gas turbines or steam turbines connected to conventional dynamoelectric generators to provide the electrical energy needed. It is estimated that the overall efficiency of this conversion is less than 50 percent.

In order to avoid inefficiency in this type of electricity generation, it has been proposed to employ fuel cells to convert the chemical energy of the fuel directly into electrical energy without the conversion of the energy of the fuel into heat and mechanical energy. While carbon fossil fuels would be desirable in fuel cells, they are not readily brought into a form suitable for electrochemical reaction. For example, coal poisons the electrodes of a fuel cell by its chemical impurities. A further problem is the requirement for a suitable electrolyte for the successful operation of such a cell.

High temperature fuel cells would be advantageous to provide a low voltage direct current power source on a continuous basis. Such cells should employ preferably a carbonaceous fuel, exhibit stability and efficiency and be low in cost. These cells would have application in various chemical process industries, such as the manufacture of aluminum and the electro-refining of copper. Furthermore, the operation of direct current motors could be accomplished with these cells. Waste heat can be employed effectively to operate the cells.

It is an object of my invention to provide a high temperature fuel cell which employs a carbonaceous fuel, exhibits stability and efficiency and is low in cost.

It is another object of my invention to provide a fuel cell operable at high temperatures in the range of 1000° C. to 1200° C.

It is another object of my invention to provide a fuel cell which employs a cathode in liquid state during operation.

It is a further object of my invention to provide a high temperature fuel cell which includes a solid, porous carbonaceous anode.

It is a still further object of my invention to provide a high temperature fuel cell which employs a solid electrolyte.

In carrying out my invention in one form, a high temperature fuel cell employs a silver cathode, said cathode characterized by being in liquid state during cell operation at high temperatures, means for supplying a gaseous oxidant to said cathode, a solid stabilized zirconia electrolyte, one surface of said electrolyte in direct contact with said cathode, means for providing a carbonaceous fuel, and the other surface of said electrolyte in direct contact with said second means.

These and various other objects, features, and advantages of the invention will be better understood from the following description taken in connection with the accompanying drawing in which:

FIGURE 3 is a sectional view of another modified high temperature fuel cell;

FIGURE 4 is a sectional view of another modified high temperature fuel cell;

FIGURE 5 is a sectional view of a further modified high temperature fuel cell; and FIGURE 6 is a sectional view of a further modified high temperature fuel cell.

Figure 1:
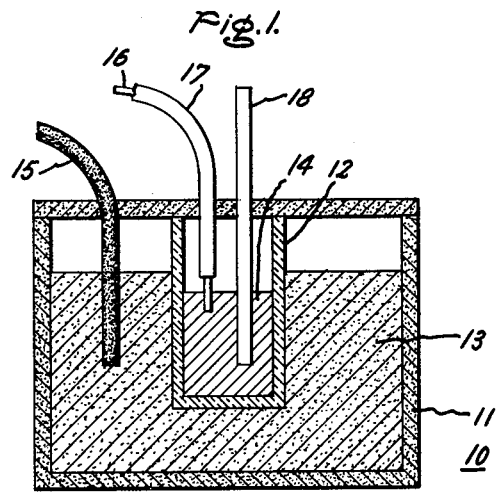
FIGURE 1 is a sectional view of a high temperature fuel cell embodying my invention.

In FIGURE 1, a high temperature fuel cell is shown generally at 10 which comprises a container 11, for example of alumina or carbon in which is positioned a second container 12 of stabilized zirconia, the cell electrolyte. Carbonaceous fuel, which is supplied in the form of a porous carbonaceous electrode 13 is positioned in container 11 and is in direct contact with container 12. A silver cathode 14 is positioned in and in direct contact with second container 12. A lead 15, such as of carbon, contacts electrode 13 by being inserted therein while a lead 16, such as of stainless steel, contacts electrode 14 in a similar manner. One end of lead 16 is inserted in the silver electrode and the other end is connected to apparatus (not shown) being operated by the cell. Lead 16 can be encased by insulation 17. The free end of lead 15 is connected in a similar manner to the same apparatus to complete the circuit from cell 10. Means are provided for supplying a gaseous oxidant in the form of air or oxygen to silver electrode 14. For example, a tube 18 of zirconia, alumina or stainless steel is inserted into electrode 14 and connected to an oxidant supply (not shown).

Figure 2:
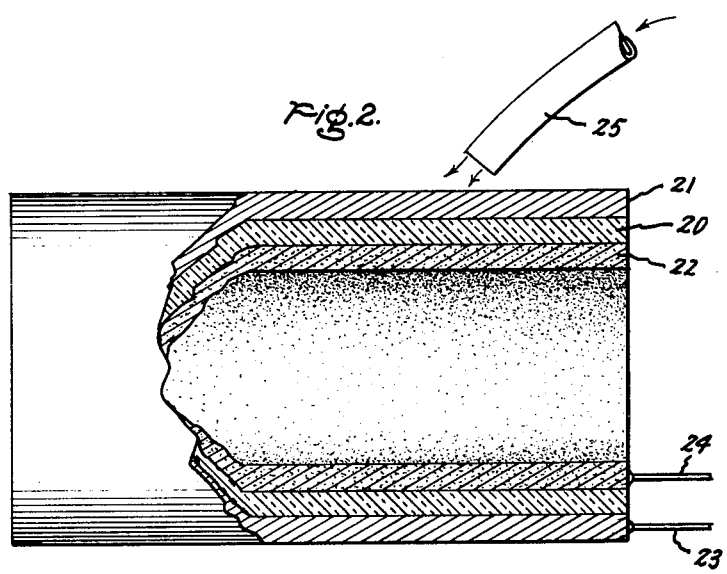
FIGURE 2 is a sectional view of a modified high temperature fuel cell.

In FIGURE 2, a modified high temperature fuel cell is shown which comprises a solid stabilized zirconia electrolyte 20 in the form of a hollow tubular member, a silver electrode 21 in direct contact with the exterior surface of member 20, and a porous carbonaceous electrode 22 in direct contact with the interior surface of member 20. The electrodes can be reversed with the silver electrode in direct contact with the interior surface of member 20 while the carbonaceous electrode is in direct contact with the exterior surface thereof. A silver lead 23 is attached to silver electrode 21 while a carbon lead 24 is attached to carbon electrode 22. The free ends of the leads are connected to apparatus (not shown) being operated by the cell. Means are provided for supplying a gaseous oxidant in the form of air or oxygen to silver electrode 21. For example, a tube 25 connected to an oxidant supply (not shown) supplies oxidant to electrode 21.

In FIGURE 3, a modified high temperature fuel cell is shown which comprises a container 11, for example, of alumina or carbon in which is positioned a second container 12 of stabilized zirconia, the cell electrolyte. A porous carbonaceous electrode 13 is positioned in container 11 and is in direct contact with container 12. A silver electrode 14 is positioned within and in direct contact with second container 12. A lead 15, such as of carbon, contacts electrode 13 by being inserted therein while a lead 16, such as of stainless steel, contacts electrode 14 in a similar manner. One end of lead 16 is inserted in the silver electrode and the other end is connected to apparatus (not shown) being operated by the cell. Lead 16 can be encased by insulation 17. The free end of lead 15 is connected in a similar manner to the same apparatus to complete the circuit from cell 10. Means are provided for supplying a gaseous oxidant in the form of air or oxygen to silver electrode 14. For example, a tube 18 of zirconia, alumina or stainless steel is inserted into electrode 14 and connected to an oxidant supply (not shown). Carbonaceous material is supplied to carbonaceous electrode 13. For example, an inlet line 26 provides a hydrocarbon gas, such as methane or propane to cell 10 wherein the gas is thermally decomposed to carbonaceous material which is supplied to carbonaceous electrode 13. An outlet line 27 removes the carbon monoxide which forms during operation at electrode 13. Thus, electrode 13 and the additional carbonaceous material provide the carbonaceous fuel for the cell.

In FIGURE 4, a modified high temperature fuel cell is shown which comprises a solid stabilized zirconia electrolyte 20 in the form of a hollow tubular member, a silver electrode 21 in direct contact with the exterior surface of member 20, and a porous carbonaceous electrode 22 in direct contact with the interior surface of member 20. The electrodes can be reversed with the silver electrode in direct contact with the interior surface of member 20 while the carbonaceous electrode is in direct contact with the exterior surface thereof. A silver lead 23 is attached to silver electrode 21 while a carbon lead 24 is attached to carbon electrode 22. The free ends of the leads are connected to apparatus (not shown) being operated by the cell. Means are provided for supplying a gaseous oxidant in the form of air or oxygen to silver electrode 21. For example, a tube 25 connected to an oxidant supply (not shown) supplies oxidant to electrode 21. Carbonaceous material is supplied to carbonaceous electrode 22. For example, an inlet line 28 provides a hydrocarbon gas, such as methane or propane to the cell wherein the gas is thermally decomposed to carbonaceous material which is supplied to carbonaceous electrode 22. An outlet line 29 removes the carbon monoxide which forms during operation at electrode 22. Thus, electrode 22 and the additional carbonaceous material provide the carbonaceous fuel for the cell.

In FIGURE 5, a further modified high temperature fuel cell is shown which comprises a container 11, for example, of alumina or carbon in which is positioned a second container 12 of stabilized zirconia. A silver electrode 14 is positioned in second container 12 which is the solid electrolyte in cell 10. One end of a lead 16, such as of stainless steel, is inserted in the silver electrode and the other end is connected to apparatus (not shown) being operated by the cell. Lead 16 can be encased by insulation 17. Carbonaceous material is supplied to the other surface of the second container 12. For example, an inlet line 26 provides a hydrocarbon gas, such as methane or propane to the cell wherein the gas is thermally decomposed to carbonaceous material which is supplied to the exterior surface of container 12 as at 30 to provide an anode. An outlet line 27 removes the carbon monoxide which forms during operation of the anode. A carbon lead 15 contacts anode 30 by being positioned adjacent electrolyte 12 and its free end is connected to the same apparatus to complete the circuit from the cell. Thus, the carbonaceous material provides the carbonaceous fuel for the cell. Means are also provided in the form of tube 18 for supplying a gaseous oxidant to silver electrode 14.

In FIGURE 6, a further modified high temperature fuel cell is shown which comprises a solid stabilized zirconia electrolyte 20 in the form of a hollow tubular member, and a silver electrode 21 in direct contact with the exterior surface of member 20. Carbonaceous material is supplied to the interior surface of member 20. For example, an inlet line 28 provides a hydrocarbon gas, such as methane or propane to the cell wherein the gas is thermally decomposed to carbonaceous material which is supplied to the interior surface of member 20 as at 31 to provide an anode. An outlet line 29 removes the carbon monoxide which forms during operation of the anode. Thus, the carbonaceous material provides the carbonaceous fuel for the cell. The electrodes can be reversed with the silver electrode in direct contact with the interior surface of member 20 while the carbonaceous anode is in direct contact with the exterior surface thereof. A silver lead 23 is attached to silver electrode 21 while a carbon lead 24 contacts anode 31 by being positioned adjacent electrolyte 20. The free ends of the leads are connected to apparatus (not shown) being operated by the cell. Means are provided for supplying a gaseous oxidant in the form of air or oxygen to silver electrode 21. For example, a tube 25 connected to an oxidant supply (not shown) supplies oxidant to electrode 21.

I discovered that an efficient, stable fuel cell could be constructed and operated in the temperature range of 1000° C. to 1200° C. to provide a low voltage direct current power source. I found that a preferred cathode was silver to which an oxidant was supplied during cell operation. My development disclosed further that a carbonaceous fuel provided a suitable anode for the cell. The carbonaceous fuel was provided in the form of a porous carbonaceous electrode, a porous carbonaceous electrode and additional carbonaceous material, or carbonaceous material. The cathode is characterized by being in liquid state and the electrolyte and anode are characterized by being in solid state during cell operation at high temperatures. I found that a carbon lead could contact the anode while a stainless steel lead encased substantially in insulation could be inserted in the silver electrode. An alumina, zirconia or stainless steel tube inserted in the silver electrode as shown in FIGURES 1, 3 and 5 or such a tube directed toward this electrode as shown in FIGURES 2, 4 and 6 provides oxygen or air to the silver in molten state during cell operation.

Solid, "stabilized" zirconia is an oxygen ion transport medium which can be used as the electrolyte in such a high temperature fuel cell. "Stabilized" zirconia is a compound with a cubic crystal structure consisting of zirconia to which is added calcium oxide, yttrium oxide, or mixed rare earth oxides. Substantially pure zirconia, that is a compound with a monoclinic structure which is not "stabilized" by the addition of the above oxides, experiences volume changes when cycled thermally with resultant shattering of the material. Furthermore, substantially pure zirconia is an electronic conductor. "Stabilized" zirconia is resistant to large volume changes upon thermally cycling and hence is mechanically stable. Additionally, "stabilized" zirconia serves as an oxygen ion transport medium by virtue of the anion vacancies generated in the zirconia structure upon cationic substitution of calcium or zirconia. Each substitution of a divalent calcium ion for a tetravalent zirconium ion results in a charge unbalance in the crystal that is redressed by the absence of a divalent oxygen ion from a normally occupied anion site in the lattice. The concentration of vacancies is thus equal to the concentration of calcium ions in the zirconia. Since the movement of an oxygen ion vacancy through the lattice is the converse of an oxygen ion movement in the opposite direction, a relatively high degree of oxygen mobility can be realized at fuel cell operating temperatures where the ion-vacancy interchange occurs readily. A flux of oxygen through the stabilized zirconia lattice is effected by the establishment of an electric field resulting from the chemical potential difference for oxygen existing across the crystal. The resultant relatively good conductivity, coupled with chemical stability and strength of the stabilized zirconia provides a very satisfactory electrolyte for high temperature fuel cells.

In the operation of fuel cell 10 in FIGURE 1, heat, such as waste heat, is supplied from a source (not shown) to raise the temperature of electrodes 13 and 14 of cell 10 in the range of 1000° C. to 1200° C. The molten silver cathode is then saturated with oxygen by bubbling air or oxygen through tube 18 into liquid electrode 14. Carbon lead 15 dissolves partially to provide carbon for electrode 13. The reactions at the cathode-electrolyte interface is as follows:

(1) $$O + 2e \rightarrow O^=$$

The oxygen ion moves through electrolyte 12 to combine with carbon in accordance with the following reaction at anode-electrolyte interface:

(2) $C + O = \rightarrow CO + 2e$

The electrons, which are given up at the anode are conducted through lead 15 to the apparatus (not shown) being operated while the oxygen at the cathode combines with the returning electrons. The carbon monoxide which is generated at the anode is released to the atmosphere, used to provide further heat for cell 10, or feed to a fuel cell employing carbon monoxide as a fuel. Such release can be through a port, valve or line (not shown). The cell of FIGURE 2 operates in the same manner as cell 10 in FIGURE 1 except that a tube 25 supplies a gaseous oxidant to liquid silver electrode 14 during cell operation.

In the operation of the cells in FIGURES 3 and 4, a carbonaceous electrode 13 and carbonaceous material supplied through tube 26 or 28 provide the carbonaceous fuel. The carbonaceous material is supplied from a hydrocarbon gas or from a carbonaceous vapor to electrode 13 or 22. Reactions 1 and 2 apply also to the operation of these cells.

In the operation of the cells shown in FIGURES 5 and 6, the carbonaceous material is supplied from a hydrocarbon gas or from a carbon vapor through inlet 26 or 28 to one surface of electrolyte 12 or 20 to form anode 30. Reactions 1 and 2 occur in the operation of these cells.

A plurality of high temperature fuel cells were made in accordance with the present invention. In Table I, in which these cells are identified by cell numbers, there is set forth for each cell its anode material, operating temperature, load voltage in volts, current density in milliamperes, and operating time. Electrical leads were connected to both electrodes and the power generated by the cell was dissipated in a simple decade resitsor. Each cell was heated to its operating temperature in a resistance furnace.

Table I

| Cell No. | Anode | Temp., °C. | Load Voltage (v.) | Current Density (ma. cm.²) | Time (Hours) |
| --- | --- | --- | --- | --- | --- |
| 1 | Coal | 1,060 | .65 | 6.0 | 2 |
| 2 | Graphite powder | 1,150 | .50 | 4.0 | 64 |
| 3 | Graphite powder, Natural gas and $H_2$. | 1,020 | .68 | 3.0 | 1 |
| 4 | do | 1,080 | .62 | 24.0 | 48 |
| 5 | do | 1,130 | .81 | 61.0 | 180 |
| 6 | Propane | 1,060 | .70 | 21.0 | 2 |
| 7 | do | 1,080 | .70 | 3.0 | 672 |
| 8 | Natural gas | 1,140 | .61 | 52.8 | 400 |
| 9 | do | 1,150 | .63 | 10.0 | 24 |
| 10 | do | 1,130 | .70 | 13.0 | 250 |
| 11 | do | 1,117 | .70 | 70.0 | 60 |
| 12 | do | 1,050 | .80 | 4.0 | 20 |
| 13 | do | 1,045 | .70 | 6.0 | 5 |
| 14 | do | 1,350 | .76 | 15.0 | 20 |
| 15 | do | 1,130 | .70 | 2.0 | 1 |
| 16 | do | 1,150 | .60 | 30.0 | 160 |

While other modifications of this invention and variations thereof which may be employed within the scope of the invention have not been described, the invention is intended to include such that may be embraced within the following claims.

What I claim as new and desire to secure by Letters Patent of the United States is:

1. A fuel cell comprising a silver cathode, said silver cathode characterized by being in liquid state during cell operation at temperatures in the range of 1000° C. to 1200° C., means for supplying a gaseous oxidant containing molecular oxygen to said cathode, a solid stabilized zirconia electrolyte, one surface of said electrolyte in direct contact with said cathode, means for providing a carbonaceous fuel, the other surface of said electrolyte in direct contact with said second means, said electrolyte and said second means characterized by being in solid state during cell operation in said temperature range, and means for excluding molecular oxygen from said second means during cell operation.

2. A fuel cell comprising a silver electrode, said silver electrode characterized by being in liquid state during cell operation at temperatures in the range of 1000° C. to 1200° C., means for supplying a gaseous oxidant containing molecular oxygen to said silver electrode, a solid, porous carbonaceous electrode, a solid stabilized zirconia electrolyte positioned between and in direct contact with said electrodes, means for excluding molecular oxygen from said solid, porous carbonaceous electrode, and said electrolyte and said carbonaceous electrode characterized by being in solid state during cell operation in said temperature range.

3. A fuel cell comprising a container, a silver electrode in said container, said silver electrode characterized by being in liquid state during cell operation at temperatures in the range of 1000° C. to 1200° C., means for supplying a gaseous oxidant containing molecular oxygen to said silver electrode, a solid, porous carbonaceous electrode, a solid stabilized zirconia electrolyte positioned between and in direct contact with said electrodes, means for excluding molecular oxygen from said solid, porous carbonaceous electrode, and said electrolyte and said carbonaceous electrode characterized by being in solid state during cell operation in said temperature range.

4. A fuel cell comprising a first container, a second container consisting of solid stabilized zirconia positioned within said first container, a silver electrode, said silver electrode characterized by being in liquid state during cell operation at temperatures in the range of 1000° C. to 1200° C., means for supplying a gaseous oxidant containing molecular oxygen to said silver electrode, a solid, porous carbonaceous electrode, one of said electrodes positioned in said first container and in direct contact with said second container, and the other of said electrodes in said second container, means for excluding molecular oxygen from said solid, porous carbonaceous electrode, and said second container and said carbonaceous electrode characterized by being in solid state during cell operation in said temperature range.

5. A fuel cell comprising a first container, a second container consisting of solid stabilized zirconia positioned within said first container, a silver electrode, said silver electrode characterized by being in liquid state during cell operation at temperatures in the range of 1000° C. to 1200° C., an electrical lead contacting said silver electrode, means for supplying a gaseous oxidant containing molecular oxygen to said silver electrode, a carbonaceous electrode, an electrical lead contacting said carbonaceous electrode, one of said electrodes positioned in said first container and in direct contact with said second container, and the other of said electrodes in said second container, means for excluding molecular oxygen from said carbonaceous electrode, and said second container and said carbonaceous electrode characterized by being in solid state during cell operation in said temperature range.

6. A fuel cell comprising a hollow member consisting of solid stabilized zirconia, a silver electrode in direct contact with a surface of said member, said silver electrode characterized by being in liquid state during cell operation at temperatures in the range of 1000° C. to 1200° C., means for supplying a gaseous oxidant containing molecular oxygen to said silver electrode, and a solid, porous carbonaceous electrode in direct contact with the opposite surface of said member, means for excluding molecular oxygen from said solid, porous carbonaceous electrode, and said member and said carbonaceous electrode characterized by being in solid state during cell operations in said temperature range.

7. A fuel cell comprising a hollow member consisting of solid stabilized zirconia, a silver electrode in direct contact with the exterior surface of said member, said silver electrode characterized by being in liquid state at temperatures in the range of 1000° C. to 1200° C., means for supplying a gaseous oxidant containing molecular oxygen to said silver electrode, and a solid, porous carbonaceous electrode in direct contact with the interior surface of said member, means for excluding molecular oxygen from said solid, porous carbonaceous electrode, and said member and said carbonaceous electrode characterized by being in solid state during cell operation in said temperature range.

8. A fuel cell comprising a silver electrode, said silver electrode characterized by being in liquid state during cell operation at temperatures in the range of 1000° C. to 1200° C., means for supplying a gaseous oxidant containing molecular oxygen to said silver electrode, a solid, porous carbonaceous electrode, a solid stabilized zirconia electrolyte positioned between and in direct contact with said electrodes, means for supplying carbonaceous material to said carbonaceous electrode, means for excluding molecular oxygen from said second electrode during cell operation, and said electrolyte and said carbonaceous electrode characterized by being in solid state during cell operation in said temperature range.

9. A fuel cell comprising a container, a silver electrode in said container, said silver electrode characterized by being in liquid state during cell operation at temperatures in the range of 1000° C. to 1200° C., means for supplying a gaseous oxidant containing molecular oxygen to said silver electrode, a solid, porous carbonaceous electrode, a solid stabilized zirconia electrolyte positioned between and in direct contact with said electrodes, means for supplying carbonaceous material to said carbonaceous electrode, means for excluding molecular oxygen from said second electrode during cell operation, and said electrolyte and said carbonaceous electrode characterized by being in solid state during cell operation in said temperature range.

10. A fuel cell comprising a first container, a second container consisting of solid stabilized zirconia positioned within said first container, a silver electrode, said silver electrode characterized by being in liquid state during cell operation at temperatures in the range of 1000° C. to 1200° C., means for supplying a gaseous oxidant containing molecular oxygen to said silver electrode, a solid, porous carbonaceous electrode, one of said electrodes positioned in said first container and in direct contact with said second container, and the other of said electrodes in said second container, means for supplying carbonaceous material to said carbonaceous electrode, means for excluding molecular oxygen from said second electrode during cell operation, and said second container and said carbonaceous electrode characterized by being in solid state during cell operation in said temperature range.

11. A fuel cell comprising a first container, a second container consisting of solid stabilized zirconia positioned within said first container, a silver electrode, said silver electrode characterized by being in liquid state during cell operation at temperatures in the range of 1000° C. to 1200° C., an electrical lead contacting said silver electrode, means for supplying a gaseous oxidant containing molecular oxygen to said silver electrode, a solid, porous carbonaceous electrode, an electrical lead contacting said carbonaceous electrode, one of said electrodes positioned in said first container and in direct contact with said second container, and the other of said electrodes in said second container, means for supplying carbonaceous material to said carbonaceous electrode, means for excluding molecular oxygen from said second elecrtode during cell operation, and said second container and said carbonaceous electrode characterized by being in solid state during cell operation in said temperature range.

12. A fuel cell comprising a hollow member consisting of solid stabilized zirconia, a silver electrode in direct contact with a surface of said member, said silver electrode characterized by being in liquid state during cell operation at temperatures in the range of 1000° C. to 1200° C., means for supplying a gaseous oxidant containing molecular oxygen to said silver electrode, a solid, porous carbonaceous electrode in direct contact with the opposite surface of said member, means for supplying carbonaceous material to said carbonaceous electrode, means for excluding molecular oxygen from said second electrode during cell operation, and said member and said carbonaceous electrode characterized by being in solid state during cell operation in said temperature range.

13. A fuel cell comprising a hollow member consisting of solid stabilized zirconia, a silver electrode in direct contact with the exterior surface of said member, said silver electrode characterized by being in liquid state at temperatures in the range of 1000° C. to 1200° C., means for supplying a gaseous oxidant containing molecular oxygen to said silver electrode, a solid, porous carbonaceous electrode in direct contact with the interior surface of said member, means for supplying carbonaceous material to said carbonaceous electrode, means for excluding molecular oxygen from said second electrode during cell operation, and said member and said carbonaceous electrode characterized by being in solid state during cell operation in said temperature range.

14. A fuel cell comprising a silver electrode, said silver electrode characterized by being in liquid state during cell operation at temperatures in the range of 1000° C. to 1200° C., means for supplying a gaseous oxidant containing molecular oxygen to said silver electrode, a solid stabilized zirconia electrolyte, said silver electrode in direct contact with one surface of said electrolyte, means for supplying carbonaceous material to the other surface of said electrolyte, means for excluding molecular oxygen from said second means during cell operation, and said electrolyte and said second means characterized by being in solid state during cell operation in said temperature range.

15. A fuel cell comprising a container, a silver electrode in said container, said silver electrode characterized by being in liquid state during cell operation at temperatures in the range of 1000° C. to 1200° C., means for supplying a gaseous oxidant containing molecular oxygen to said silver electrode, a solid stabilized zirconia electrolyte positioned within said container, said silver electrode in direct contact with one surface of said electrolyte, means for supplying carbonaceous material to the other surface of said electrolyte, means for excluding molecular oxygen from said second means during cell operation, and said electrolyte and said second means characterized by being in solid state during cell operations in said temperature range.

16. A fuel cell comprising a first container, a second container consisting of solid stabilized zirconia positioned within said first container, a silver electrode, said silver electrode characterized by being in liquid state during cell operation at temperatures in the range of 1000° C. to 1200° C., means for supplying a gaseous oxidant containing molecular oxygen to said silver electrode, said silver electrode in direct contact with one surface of said second container, means for supplying carbonaceous material to the other surface of said second container, means for excluding molecular oxygen from said second means during cell operation, and said second container and said second means characterized by being in solid state during cell operation in said temperature range.

17. A fuel cell comprising a first container, a second container consisting of solid stabilized zirconia positioned within said first container, a silver electrode, said silver electrode characterized by being in liquid state during cell operation at temperatures in the range of 1000° C. to 1200° C., an electrical lead contacting said silver electrode, means for supplying a gaseous oxidant containing molecular oxygen to said silver electrode, said silver electrode in direct contact with one surface of said silver electrode in direct contact with one surface of said second container, means for supplying carbonaceous material to the other surface of said second container, and an electrical lead contacting said other surface of said second container, means for excluding molecular oxygen from said second means during cell operation, said second container and said second means characterized by being in solid state during cell operation in said temperature range.

18. A fuel cell comprising a hollow member consisting of solid stabilized zirconia, a silver electrode in direct contact with a surface of said member, said silver electrode characterized by being in liquid state during cell operation at temperatures in the range of 1000° C. to 1200° C., means for supplying a gaseous oxidant containing molecular oxygen to said silver electrode, means for supplying carbonaceous material to the opposite surface of said member, means for excluding molecular oxygen from said second means during cell operation, and said member and said second means characterized by being in solid state during cell operation in said temperature range.

19. A fuel cell comprising a hollow member consisting of solid stabilized zirconia, a silver electrode in direct contact with the exterior surface of said member, said silver electrode characterized by being in liquid state at temperatures in the range of 1000° C. to 1200° C., means for supplying a gaseous oxidant containing molecular oxygen to said silver electrode, and means for supplying carbonaceous material to the interior surface of said member, means for excluding molecular oxygen from said second means during cell operation, and said member and said second means characterized by being in solid state during cell operation in said temperature range.

20. In a fuel cell, in combination, a molten silver cathode, a solid stabilized zirconia electrolyte, and an anode of porous carbonaceous material supported by the electrolyte in operative relation to said cathode.

References Cited in the file of this patent

UNITED STATES PATENTS

| | | |
|---|---|---|
| 569,591 | Short | Oct. 13, 1896 |
| 2,914,596 | Gorin | Nov. 24, 1959 |

FOREIGN PATENTS

| | | |
|---|---|---|
| 8,906 | Great Britain | May 15, 1897 |

OTHER REFERENCES

Journal of Electrochemical Society, vol. 104, June 1957, pages 379–386.